(12) United States Patent
Witzenberger

(10) Patent No.: US 7,490,682 B2
(45) Date of Patent: Feb. 17, 2009

(54) DEVICE FOR REVERSING THE STEERING MOVEMENT OF A STEERING-WHEEL SHAFT OF A VEHICLE

(75) Inventor: Max Witzenberger, Aindling (DE)

(73) Assignee: RENK Aktiengesellschaft, Augsburg (DE)

( * ) Notice: Subject to any disclaimer, the term of this patent is extended or adjusted under 35 U.S.C. 154(b) by 0 days.

(21) Appl. No.: 11/159,718

(22) Filed: Jun. 23, 2005

(65) Prior Publication Data
US 2006/0000649 A1    Jan. 5, 2006

(30) Foreign Application Priority Data
Jun. 30, 2004  (DE) .................. 10 2004 031 462

(51) Int. Cl.
*B62D 55/00* (2006.01)
*B62D 5/00* (2006.01)

(52) U.S. Cl. ............... 180/9.1; 180/446; 180/444; 180/443; 180/8.7; 180/9.44

(58) Field of Classification Search ............ 180/446, 180/444, 443
See application file for complete search history.

(56) References Cited

U.S. PATENT DOCUMENTS

| | | | |
|---|---|---|---|
| 4,718,508 A | 1/1988 | Tervola | |
| 6,179,083 B1 | 1/2001 | Yamauchi | |
| 6,199,654 B1 * | 3/2001 | Kojo et al. | 180/443 |
| 6,382,344 B1 | 5/2002 | Lohner et al. | |
| 6,505,702 B1 * | 1/2003 | Shinmura et al. | 180/446 |
| 6,763,908 B2 * | 7/2004 | Ogawa et al. | 180/446 |
| 7,004,281 B2 * | 2/2006 | Hidaka | 180/446 |

FOREIGN PATENT DOCUMENTS

| | | |
|---|---|---|
| DE | 197 55 312 | 6/1999 |
| DE | 198 52 447 | 6/1999 |
| DE | 101 52 704 | 7/2003 |
| EP | 1 375 294 | 1/2004 |
| EP | 1 375 294 | 5/2004 |
| GB | 2 259 062 | 3/1993 |
| JP | 62 47332 | 9/1994 |
| JP | 6247334 | 9/1994 |
| WO | WO 2004/018277 | 3/2004 |

* cited by examiner

*Primary Examiner*—Paul N Dickson
*Assistant Examiner*—Marlon A Arce Diaz
(74) *Attorney, Agent, or Firm*—Cohen Pontani Lieberman & Pavane LLP

(57) ABSTRACT

A device for reversing the steering movement of a steering-wheel shaft of a vehicle by superimposing a further movement on the steering movement.

11 Claims, 1 Drawing Sheet

DEVICE FOR REVERSING THE STEERING MOVEMENT OF A STEERING-WHEEL SHAFT OF A VEHICLE

BACKGROUND OF THE INVENTION

The present invention relates to a device for reversing the steering movement of a steering-wheel shaft.

Tracked vehicles, above all rapid tracked vehicles, are usually steered by active steering systems in which further drive movements are superimposed on the track chains in addition to the main drive direction. During forward travel, the superimposed rotational direction for executing a left turn is oriented forwards on the right-hand chain and is oriented backwards on the left-hand chain.

During travel in the reverse direction, the superimposed rotational directions remain identical without further devices, with the result that the travelled track is reversed. That is to say, unlike in the case of passenger cars or trucks, the vehicle would maintain its rotational direction.

As tracked vehicles make up only a negligibly small percentage of all vehicles, there is often the wish for a tracked vehicle to react in exactly the same way as a wheeled vehicle, that is to say to retain the same track during reverse travel in turns as in forward travel.

SUMMARY OF THE INVENTION

An object of the invention to provide an operationally reliable device for switching over a steering mechanism, using which device the direction of movement of the steering-wheel shaft can be reversed for travel in the reverse direction.

The object of the present invention is achieved by a device for superimposing further movements to steering movements generated by a steering wheel.

The device according to the invention may also be suitable for remote control operation. If the electric or other drive fails, the device may also be operated purely mechanically by the steering wheel.

The device according to the present invention may be monitored using position sensors and advantageously alarm the driver in the event of a fault.

The superimposed drive of a device according to the invention may also be used for power assistance of the steering actuation and in the case of a drive-by-wire system (electric remote control).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following text, the present invention will be explained in greater detail using the associated diagrammatic drawings, in which.

DETAILED DESCRIPTION OF THE PRESENTLY PREFERRED EMBODIMENTS

Figure 1:
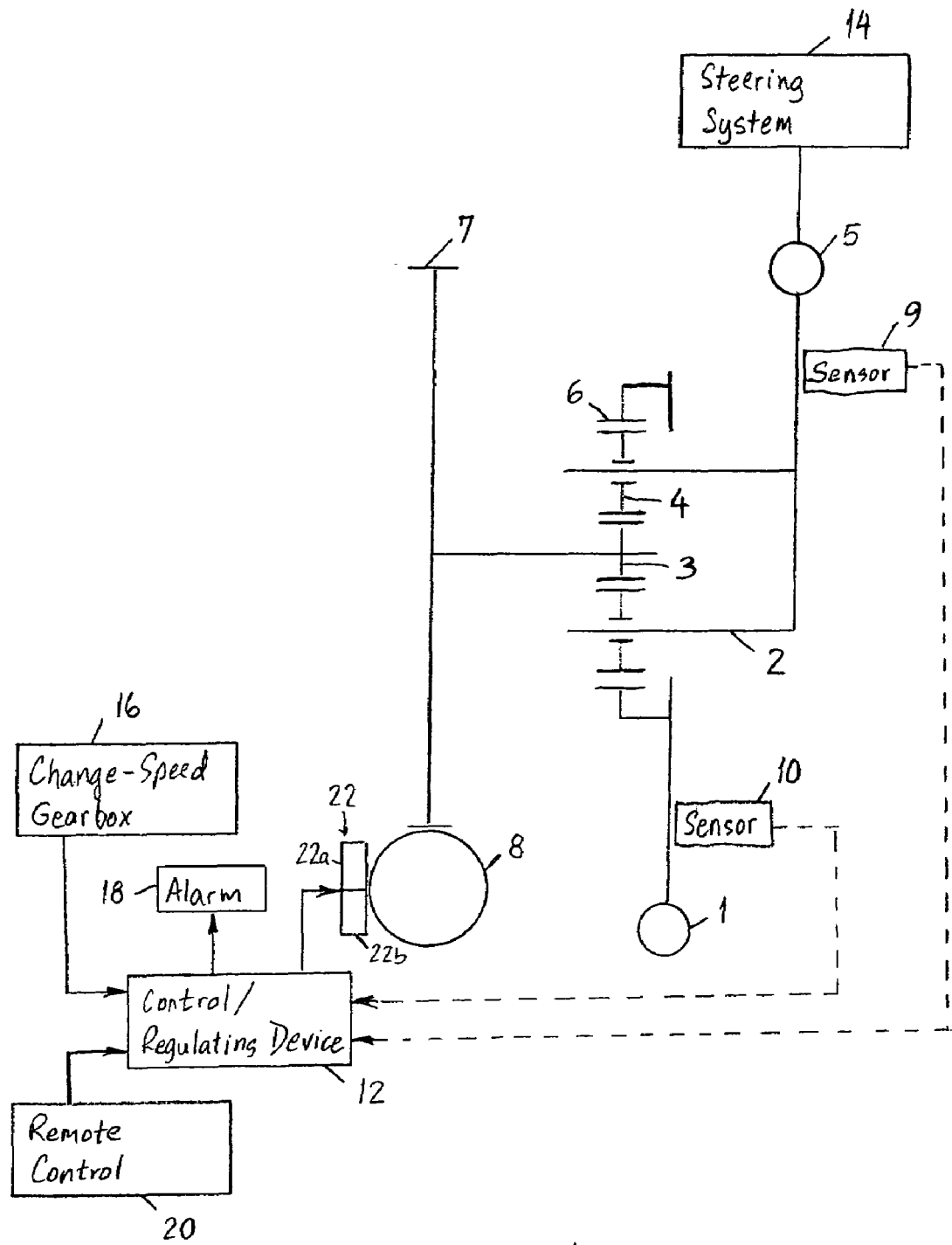
FIG. 1 is a schematic diagram showing an exemplary embodiment of the present invention.

FIG. 1 is a schematic drawing depicting an example of a device for reversing the steering movement generated by a steering wheel shaft in a vehicle which is configured according to the present invention. A driver of the vehicle sets the desired steering direction using a steering wheel 1. The steering direction set by the driver is transmitted to a steering system 14 by a lever 5. The present invention may be used in tracked vehicles or wheeled vehicles with wheel-based steering, the lever 5 interacting, for example, with steering hydrostatics.

Instead of using a hydrostatic steering system, other systems may be used to generate an infinitely variable or stepped superimposed rotational speed such as, for example, mechanical (stepped), electric or hydrodynamic drives and every conceivable combination thereof. Depending on which solution is implemented on a vehicle, the corresponding element of the respective steering assembly is actuated by the device according to the present invention.

If there are electric drives or electric or electrohydraulic actuation systems, it is relatively simple to switch over the steering movement of a steering-wheel shaft.

As safety devices are paramount in the case of the steering system, preference is often given, however, to purely mechanical actuation. Thus it is known in active steering systems, for example, to connect the adjustable-angle plate of the hydrostatic motor to the steering handle in a directly mechanical manner, optionally also in a servo-assisted manner.

To reverse the steering movement, a device according to the present invention is installed in the steering drive which transmits the mechanical steering movement of the steering wheel 1 (or steering lever) to the vehicle steering system 14. According to the invention, the device superimposes a further steering movement on the steering movement generated by the steering wheel 1.

Superimposing is preferably effected by a suitable gear mechanism such as, for example, a planetary-gear set. In the embodiment shown by way of example, the steering wheel 1 is connected to a rotatably mounted internal gear 6 of the planetary gear mechanism. The internal gear 6 interacts with a sun gear 3 via planetary gears 4. The planetary gears 4 are mounted rotatably on the planetary carrier 2 which is likewise mounted rotatably. The lever 5 which transmits the steering movement to the vehicle steering device or activates the vehicle steering system is arranged on the planetary carrier 2.

The sun gear 3 is fixed with respect to rotation on a rotatably mounted shaft 11 so that the sun gear rotates with the shaft 11. A worm gear 7 is also arranged on the shaft 11 so that the worm gear 7 rotates with it. The worm gear 7 interacts with a worm 8 which can be imparted with a rotational movement by a superimposing drive 22 such as, for example, an electric motor. This rotational movement of the worm is transmitted via the worm gear 7 and the sun gear 3 to the planetary gear mechanism in which it is superimposed on the rotational movement of the steering wheel 1. The steering movement which results from the superimposement of the two movements is transmitted to the vehicle steering device via the lever 5.

The signals which reveal the driving direction of a vehicle such as signals from a change-speed gearbox 16 or other signals of the vehicle, may be evaluated in a control/regulating device 12. After the driving direction has been evaluated, the control/regulating device 12 can activate the superimposed drive appropriately.

In the forward driving direction, the superimposed movement is equal to zero. Alternatively, the superimposed movement may have an assistive effect based on a speed of the vehicle. The lever 5 thus moves in the same rotational direction as the steering wheel 1.

In the reverse driving direction, a rotational movement in the opposite direction at preferably approximately twice the rotational speed of the steering wheel 1 is superimposed on the planet carrier 2, as a result of which the lever 5 is rotated counter to the rotational direction of the steering wheel 1.

To determine the steering-wheel setting and the position of the lever 5, position sensors 9, 10 may be connected to transmitting signals to the control/regulating device 12 where they are processed. The position sensors 9, 10 are preferably designed to be multiply redundant, with the result that it is still possible to determine the position if a sensor fails. The control/regulating device 12 compares the sensor signals with predefined setpoint values which are stored for every driving state, and alarms the driver using alarm 18 if the movements of the lever 5 or of the steering wheel 1 do not correspond to the conditions which are predefined for them, i.e., in the event of a fault.

Instead of using the worm 8 and worm gear 7, the movement can also be superimposed by a direct drive of the sun gear 3. A self-locking drive is preferably provided. In this case, it is possible for the steering system to be operated solely by the steering wheel 1 if the superimposed drive fails or there is a fault in the drive branch.

Furthermore, if the rotational movement of the steering wheel 1 is locked, the vehicle can be steered by the superimposed drive. This can also take place via a remote control 20.

The superimposed drive 22 is preferably of multiple-circuit configuration, that is to say an electric drive motor is provided, for example, with a plurality of independent windings 22a, 22b or at least two electric motors are provided which can be operated independently of one another. Instead of an electric motor, the superimposed drive 22 may comprise hydraulic or pneumatic superimposed drives, linear motors or other drive devices. These alternative devices may also include redundant devices which operate independent of each other.

The steering movements which are to be superimposed can be introduced into the planetary gear mechanism and the superimposed movement can be forwarded in a different way to that in the exemplary embodiment shown, also via other elements. Although a planetary gear mechanism is shown in the example, other devices may be used for superimposing movements.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for reversing the steering movement in a steering drive of a vehicle produced by a steering-wheel shaft, said device comprising:
a gear mechanism coupled to the steering-wheel shaft and configured to superimpose a further movement on the steering movement such that the steering movement is reversed when the vehicle travels in the reverse direction.

2. The device of claim 1, wherein the gear mechanism further comprises a summing transmission, said further movement being superimposed on said steering movement positively or negatively by said summing transmission.

3. The device of claim 1, wherein movement of the steering drive being generated solely by said further movement when said steering-wheel shaft is still.

4. The device of claim 1, wherein said steering-wheel shaft is lockable.

5. The device of claim 1, wherein said steering movement of the steering drive is generated solely by the steering-wheel shaft if the superimposed movement fails.

6. The device of claim 1, wherein the superimposed movement is an electrically or hydraulically generated movement.

7. The device of claim 1, wherein the superimposed movement is generated using multiple circuits.

8. The device of claim 1, wherein the gear mechanism further comprises a planetary gear mechanism for superimposing the further movement.

9. The device of claim 8, wherein said planetary gear mechanism comprises a sun gear, a planetary carrier having at least one planetary gear engaging said sun gear, and an internal gear radially surrounding said planetary carrier and engaging said at least one planetary gear, said internal gear being connected to one of a steering wheel or steering lever and said planetary carrier being connected to a steering system of the vehicle, wherein rotation of said internal gear produces a movement of said planetary carrier when said sun gear is stationary, and the further movement is superimposed by rotating said sun gear.

10. The device of claim 9, wherein the gear mechanism further comprises a drive connected to said sun gear for superimposing the further movement to said planetary carrier.

11. The device of claim 10, wherein said drive electrically or hydraulically generates the rotational movement to be superimposed on said planetary carrier.

* * * * *